United States Patent
Copic et al.

(10) Patent No.: US 10,088,678 B1
(45) Date of Patent: Oct. 2, 2018

(54) HOLOGRAPHIC ILLUSTRATION OF WEATHER

(71) Applicant: Microsoft Technology Licensing, LLC, Redmond, WA (US)

(72) Inventors: John Copic, Redmond, WA (US); Gregory Bishop Bahm, Kirkland, WA (US); Jonathan Gustav Paulovich, Redmond, WA (US); Jedd Alexander Chevrier, Redmond, WA (US); Michael Casey Lanigan, Bellevue, WA (US); Ryan Hastings, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/590,845

(22) Filed: May 9, 2017

(51) Int. Cl.
  *G02B 27/01* (2006.01)
  *G01W 1/10* (2006.01)
  *G01S 19/14* (2010.01)

(52) U.S. Cl.
  CPC .......... *G02B 27/0103* (2013.01); *G01S 19/14* (2013.01); *G01W 1/10* (2013.01); *G02B 27/0172* (2013.01); *G02B 2027/0109* (2013.01); *G02B 2027/0174* (2013.01); *G02B 2027/0178* (2013.01)

(58) Field of Classification Search
  CPC ............ G02B 27/0103; G02B 27/0172; G02B 2027/0109; G02B 2027/0174; G02B 2027/0178; G01S 19/14; G01W 1/10
  See application file for complete search history.

(56) References Cited

U.S. PATENT DOCUMENTS

| 5,379,215 A * | 1/1995 | Kruhoeffer ........... G01S 13/955 702/3 |
| 5,432,895 A | 7/1995 | Myers |
| 5,598,359 A | 1/1997 | Montag et al. |

(Continued)

OTHER PUBLICATIONS

Rautenhaus, et al., "Three-dimensional visualization of ensemble weather forecasts—Part 1: The visualization tool Met.3D (version 1.0)", In Journal of Geoscientific Model Development, vol. 8, Jul. 31, 2015, 2329-2353 pages.

(Continued)

*Primary Examiner* — Nay Tun
(74) *Attorney, Agent, or Firm* — Alleman Hall Creasman & Tuttle LLP

(57) ABSTRACT

In a method to illustrate a weather condition via a near-eye display system, a representation of a geographic region is displayed via the near-eye display system. For each of a series of elevations above the geographic region, a weather-data slice is received, which defines a weather-parameter value for each of a plurality of 2D coordinates at that elevation. A volume-filling weather model is constructed based on the weather-parameter values received for each elevation and 2D coordinate. A digital filter and a coordinate transform are then applied to the volume-filling weather model to obtain a weather-display model, the weather-display model including a display-parameter value for each of a plurality of 3D coordinates. Then, the weather-display model is displayed via the near-eye display system, co-registered to the representation of the geographic region.

20 Claims, 6 Drawing Sheets

(56) References Cited

U.S. PATENT DOCUMENTS

| | | | | |
|---|---|---|---|---|
| 6,266,063 | B1* | 7/2001 | Baron | G01W 1/10 345/419 |
| 6,339,747 | B1* | 1/2002 | Daly | G01W 1/10 702/3 |
| 6,683,609 | B1* | 1/2004 | Baron, Sr. | G01W 1/10 345/419 |
| 6,829,536 | B2* | 12/2004 | Moore | G01W 1/10 702/3 |
| 7,609,200 | B1 | 10/2009 | Woodell et al. | |
| 9,437,170 | B1 | 9/2016 | Quevedo Montesdeoca | |
| 9,652,888 | B1* | 5/2017 | Johnson | G06T 17/05 |
| 2005/0252984 | A1 | 11/2005 | Ahmed | |
| 2010/0070175 | A1* | 3/2010 | Soulchin | G06T 17/05 701/414 |
| 2010/0238161 | A1 | 9/2010 | Varga et al. | |
| 2010/0254593 | A1* | 10/2010 | Wilcox | G01S 7/06 382/154 |
| 2013/0083009 | A1* | 4/2013 | Geisner | A63F 13/02 345/419 |
| 2013/0232430 | A1 | 9/2013 | Reitan | |
| 2014/0180508 | A1 | 6/2014 | Zaneboni et al. | |
| 2016/0363696 | A1* | 12/2016 | Dao | G01W 1/00 |
| 2017/0031056 | A1* | 2/2017 | Vega-Avila | G01W 1/12 |
| 2018/0005434 | A1* | 1/2018 | Ren | G06T 17/05 |

OTHER PUBLICATIONS

Wenke, et al., "Automatic generation of large scale 3D cloud based on weather forecast data", In Proceedings of International Conference on Virtual Reality and Visualization Processing, Sep. 14, 2012, 69-73 pages.

Wang, et al., "3D Reconstruction and Interaction for Smart City based on World Wind", "In Proceedings of International Conference on Audio, Language and Image Processing", Jul. 18, 2012, 953-956 pages.

O'Callaghan, Jonathan, "Watch the world's weather in Real Time: Live interactive 3D map lets you watch rain, clouds and even hurricanes across the globe", http://www.dailymail.co.uk/sciencetech/article-2741821/Watch-world-s-weather-Realtime-Live-interactive-3D-map-lets-watch-rain-clouds-hurricanes-globe.html, Sep. 3, 2014, 8 pages.

Ru, Yi, "Volumetric Visualization of NEXRAD Level II Doppler Weather Data From Multiple Sites", In Master Thesis of Purdue University, Dec. 2007, 71 pages.

Head, Anthony, "3D Weather—Towards a Real-time 3D Simulation of Localised Weather", In Proceedings of Electronic Visualisation and the Arts, Jul. 8, 2011, 35-41 pages.

Elhakim, et al., "Interactive 3D visualization for wireless sensor networks", Published in The Visual Computer ; International Journal of Computer Graphics, Springer, Berlin, DE, Apr. 17, 2010, 7 Pages.

Heinrich, et al., "An augmented reality weather system", Published in Advances in Computer Entertainment Technology, ACM, 2 Penn Plaza, Suite 701, New York NY, Dec. 3, 2008, 4 Pages.

"International Search Report and Written Opinion Issued in PCT Application No. PCT/US18/028716", dated Jul. 24, 2018, 11 Pages.

* cited by examiner

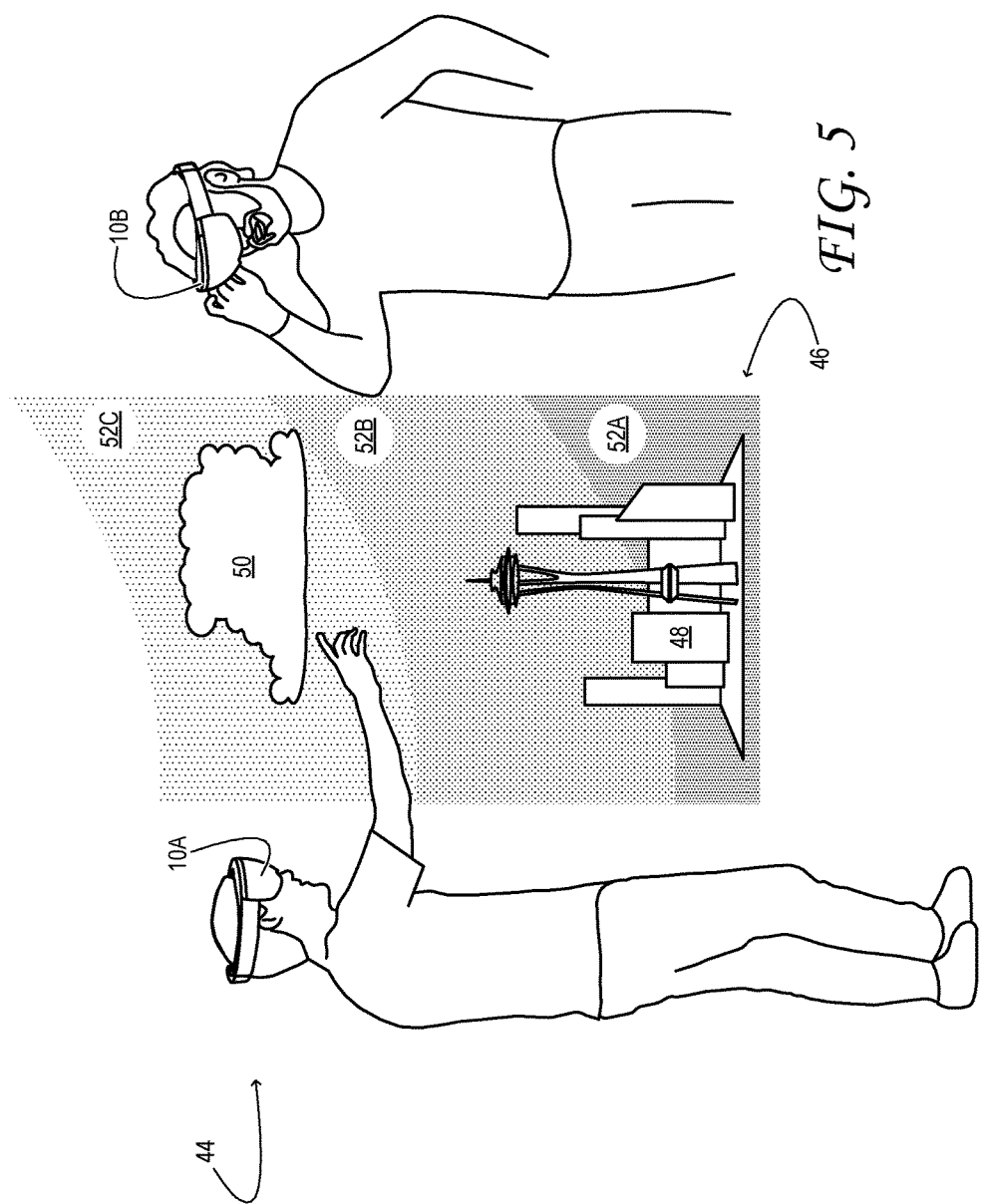

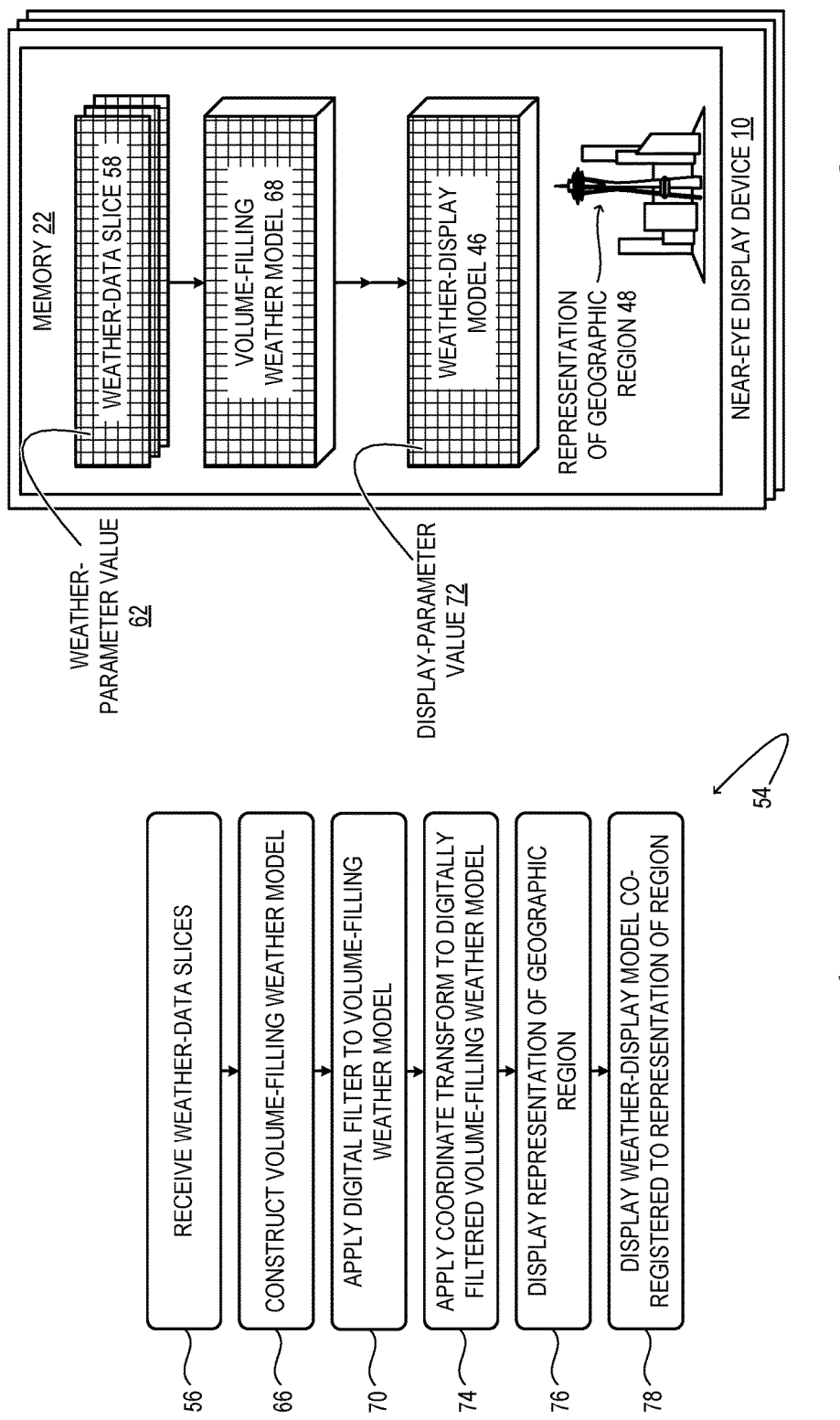

US 10,088,678 B1

HOLOGRAPHIC ILLUSTRATION OF WEATHER

BACKGROUND

Consumers look to technology to make their lives more predictable. For instance, a smartphone user may begin his or her day by glancing at a weather widget installed on the smartphone. The weather widget allows the user to absorb the gist of a weather forecast without reading a lengthy narrative. On the other hand, the amount of weather information that can be efficiently conveyed via a conventional smartphone is limited. More detailed weather information, if presented intuitively, could better prepare the user for the day ahead.

SUMMARY

One aspect of this disclosure is directed to a method to illustrate a weather condition via a near-eye display system. In this method, a representation of a geographic region is displayed via the near-eye display system. For each of a series of elevations above the geographic region, a weather-data slice is received, which defines a weather-parameter value for each of a plurality of 2D coordinates at that elevation. A volume-filling weather model is constructed based on the weather-parameter values received for each elevation and 2D coordinate. A digital filter and a coordinate transform are then applied to the volume-filling weather model to obtain a weather-display model having a display-parameter value associated with each of a plurality of 3D coordinates. The weather-display model is displayed via the near-eye display system, co-registered to the representation of the geographic region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows aspects of a near-eye display system comprised of multiple near-eye display devices.

FIG. 6A illustrates an example method to display a virtual object.

FIG. 6B schematically shows an arrangement of data structures used in the method of FIG. 6A.

DETAILED DESCRIPTION

Figure 1:
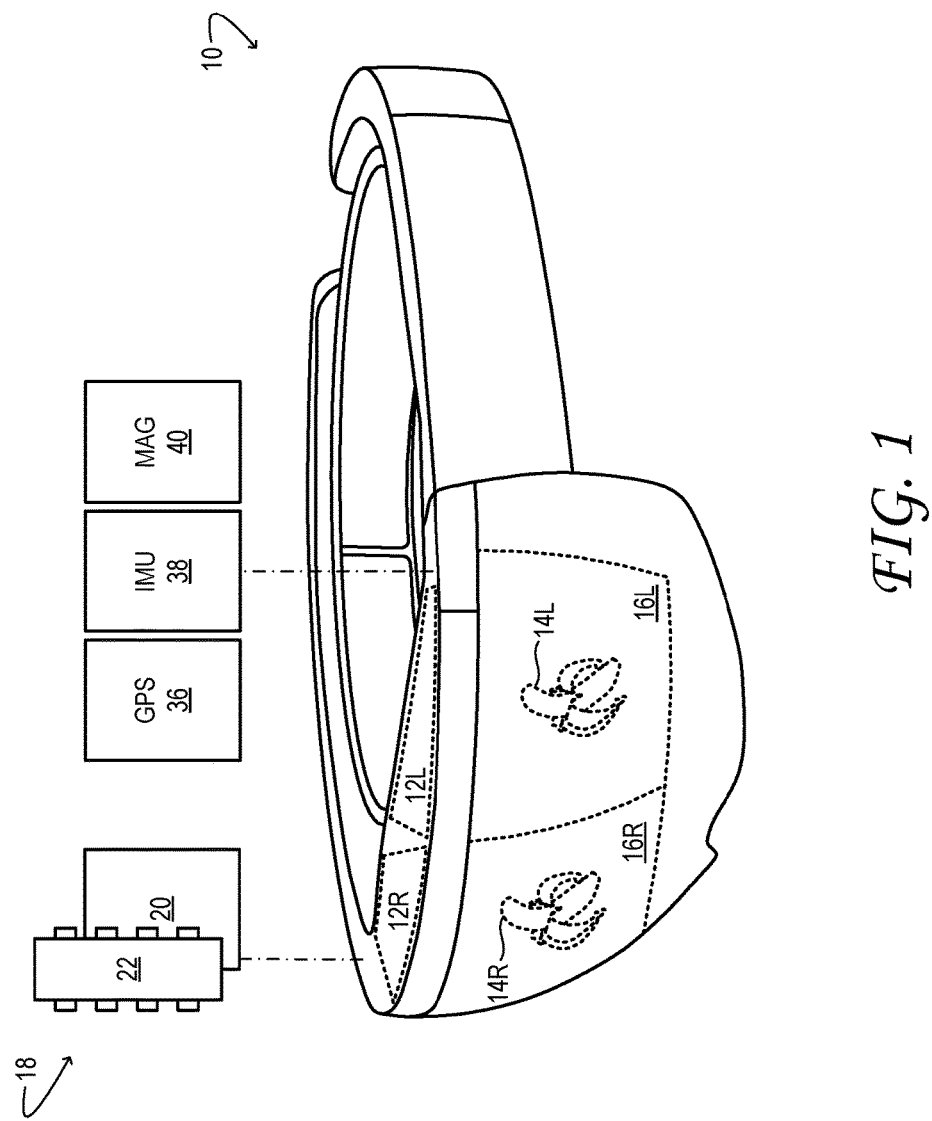
FIG. 1 shows aspects of an example near-eye display device.

Aspects of this disclosure will now be described by example and with reference to the drawing figures listed above. Components, process steps, and other elements that may be substantially the same in one or more embodiments are identified coordinately and described with minimal repetition. It will be noted, however, that elements identified coordinately may also differ to some degree. It will be further noted that the drawing figures are schematic and generally not drawn to scale. Rather, the various drawing scales, aspect ratios, and numbers of components shown in the figures may be purposely distorted to make certain features or relationships easier to see.

As noted above, this disclosure is directed to presenting weather information to one or more users of a near-eye display system comprised of one or more near-eye display devices. Although the nature of the one or more near-eye display devices is not particularly limited, one example device applicable to the disclosed mode of presentation will be described below. It should be understood, however, that other, alternative near-eye display devices are also envisaged.

FIG. 1 shows aspects of an example near-eye display device 10 in one, non-limiting embodiment. The near-eye display device includes a right microprojector 12R configured to project a right display image 14R and a left microprojector 12L configured to project a left display image 14L. Viewed binocularly by a user of the near-eye display device, the right and left display images are fusible in the user's visual cortex to effect stereoscopic, 3D image display. Although separate right and left microprojectors are shown in FIG. 1, a single microprojector, alternatively, may be used to form both the right and left display images.

Near-eye display device 10 includes a right display window 16R and a left display window 16L. In some embodiments, the right and left display windows 16 are at least partially transparent from the perspective of the user, to give the user a clear view of his or her surroundings. This feature enables virtual display imagery to be admixed with real imagery from the surroundings, for an illusion of 'augmented' or 'mixed' reality. In other embodiments, the display windows are opaque, so as to provide a fully immersive VR experience.

Near-eye display device 10 includes an integrated computer system 18 having at least one processor 20 and an associated electronic memory machine 22. The electronic memory machine holds instructions that cause the processor to enact the methods described further below. In some embodiments, the processor may comprise one or more of a central processing unit (CPU) and a graphics processing unit (GPU).

In some embodiments, display imagery is received in real time from an external network via processor 20 and conveyed to microprojectors 12. The display imagery may be transmitted in any suitable form—viz., type of transmission signal and data structure. The signal encoding the display imagery may be carried over a wired or wireless communication link to the processor. In other embodiments, at least some display-image composition and processing may be enacted within the processor itself.

When near-eye display device 10 is in use, processor 20 sends appropriate control signals to right microprojector 12R that cause the right microprojector to form right display image 14R in right display window 16R. Likewise, the processor sends appropriate control signals to left microprojector 12L that cause the left microprojector to form left display image 14L in left display window 16L. Naturally, the display-device user views the right and left display images through right and left eyes, respectively. When the right and left display images are composed and presented in an appropriate manner (vide infra), the user experiences the illusion of one or more virtual objects at specified positions, having specified 3D content and other display properties. A plurality of virtual objects of any desired complexity may be displayed concurrently in this manner, so as to present a complete virtual scene having foreground and background portions.

Figure 2:
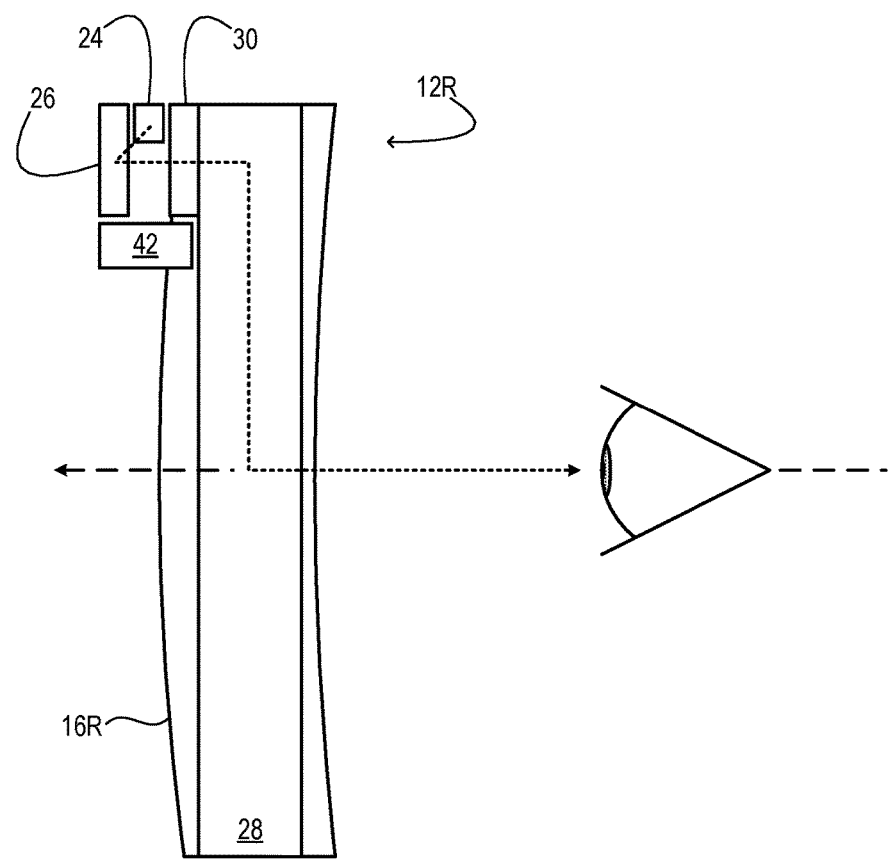
FIG. 2 shows aspects of an example microprojector, forward-facing camera, and display window of a near-eye display device.

FIG. 2 shows aspects of right microprojector 12R and the associated display window 16R in one, non-limiting embodiment. The microprojector includes a light source 24 and a liquid-crystal-on-silicon (LCOS) array 26. The light source may comprise an ensemble of light-emitting diodes (LEDs)—e.g., white LEDs or a distribution of red, green, and blue LEDs. The light source may be situated to direct its emission onto the LCOS array, which is configured to form a display image based on the control signals from processor 20. The LCOS array may include numerous, individually addressable pixels arranged on a rectangular grid or other geometry. In some embodiments, pixels reflecting red light may be juxtaposed in the array to pixels reflecting green and blue light, so that the LCOS array forms a color image. In some embodiments, a backlit transmissive liquid-crystal display (LCD), digital micromirror, or active-matrix LED array may be used in lieu of the LCOS array. In still other embodiments, scanned-beam technology may be used to form the display image.

In some embodiments, the display image from LCOS array 26 may not be suitable for direct viewing by the user of near-eye display device 10. In particular, the display image may be offset from the user's eye, may have an undesirable vergence, and/or a very small exit pupil (i.e., area of release of display light, not to be confused with the user's anatomical pupil). In view of these issues, the display image from the LCOS array may be further conditioned en route to the user's eye, as described below.

In the embodiment of FIG. 2, the display image from LCOS array 26 is received into a vertical pupil expander 28. The vertical pupil expander lowers the display image into the user's field of view, and in doing so, expands the exit pupil of the display image in the 'vertical' direction. In this context, the vertical direction is the direction orthogonal to the user's interocular axis and to the direction that the user is facing. From vertical pupil expander 28, the right display image is received into a horizontal pupil expander, which may be coupled into or embodied as right display window 16R. In other embodiments, the horizontal pupil expander may be distinct from the right display window. The horizontal pupil expander expands the exit pupil of the display image in the 'horizontal' direction, which, in this context, is the direction parallel to the interocular axis of the user of near-eye display device 10—i.e., the direction in and out of the page in FIG. 2. By passing through the horizontal and vertical pupil expanders, the display image is presented over an area that covers the eye. This enables the user to see the display image over a suitable range of horizontal and vertical offsets between the microprojector and the eye. In practice, this range of offsets may reflect factors such as variability in anatomical eye position among users, manufacturing tolerance and material flexibility in near-eye display device 10, and imprecise positioning of the near-eye display device on the user's head.

In some embodiments, right microprojector 12R may apply optical power to the display image from LCOS array 26, in order to modify the vergence of the display image. Such optical power may be provided by the vertical and/or horizontal pupil expanders, or by lens 30, which couples the display image from the LCOS array into the vertical pupil expander. If light rays emerge convergent or divergent from the LCOS array, for example, the microprojector may reverse the image vergence so that the light rays are received collimated into the user's eye. This tactic can be used to form a display image of a far-away virtual object. Alternatively, the microprojector may be configured to impart a fixed or adjustable divergence to the display image, consistent with a virtual object positioned a finite distance in front of the user. Naturally, the foregoing description of right microprojector 12R and right display window 16R applies equally to left microprojector 12L and left display window 16L.

Figure 3:
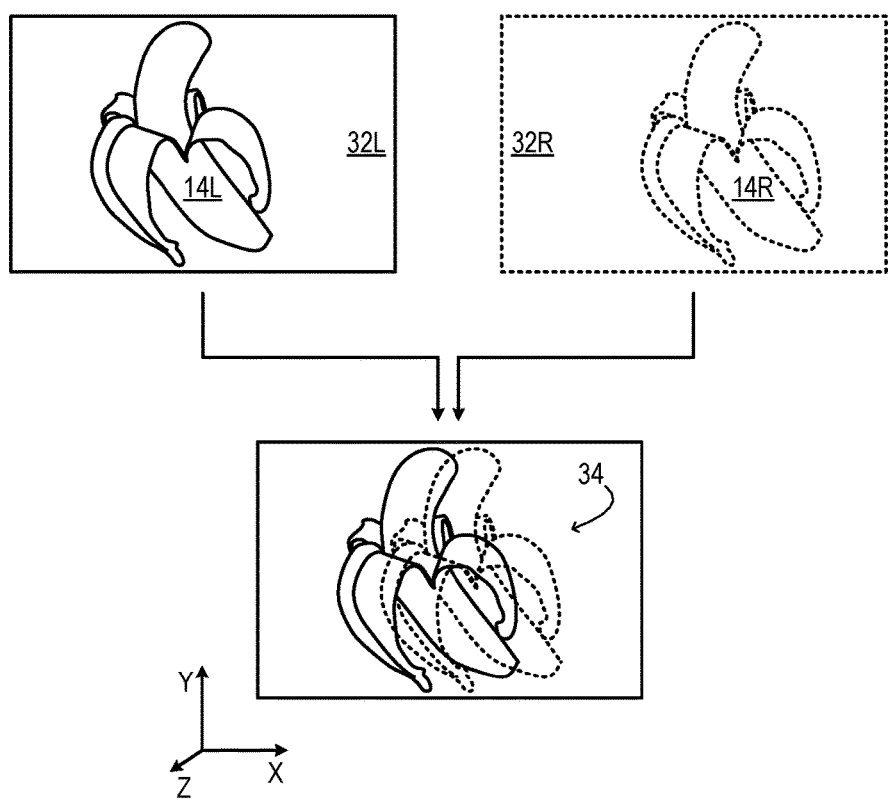
FIGS. 3 and 4 illustrate, by way of example, stereoscopic display of a virtual object.

A user's perception of distance to a given locus of a virtual object is affected not only by display-image vergence but also by positional disparity between the right and left display images. This principle is illustrated by way of example in FIGS. 3 and 4. FIG. 3 shows right and left image frames 32R and 32L, overlaid upon each other for purposes of illustration. The right and left image frames correspond to the image-forming areas of LCOS arrays 26 of right and left microprojectors 12R and 12L. As such, the right image frame encloses right display image 14R, and the left image frame encloses left display image 14L. Rendered appropriately, the right and left display images may appear to the user as a 3D virtual object 34 of any desired complexity. In the example of FIG. 3, the virtual object includes a surface contour having a depth coordinate Z associated with each pixel position (X, Y) of the right and left image frames. The desired depth coordinate may be simulated in the following manner, with reference now to FIG. 4.

Right and left microprojectors 12 may be configured to project each locus P of right and left display images 14 onto focal a plane F located a fixed distance $Z_0$ from the interpupillary axis (IPA) of the user. $Z_0$ is a function of the vergence applied by the microprojectors. In one embodiment, $Z_0$ may be set to 'infinity', so that each microprojector presents a display image in the form of collimated light rays. In another embodiment, $Z_0$ may be set to two meters, requiring each microprojector to present the display image in the form of diverging rays. In some embodiments, $Z_0$ may be chosen at design time and remain unchanged for all virtual objects rendered by near-eye display device 10. In other embodiments, each microprojector may be configured with electronically adjustable optical power, allowing $Z_0$ to vary dynamically according to the range of distances over which virtual object 34 is to be presented.

Figure 4:
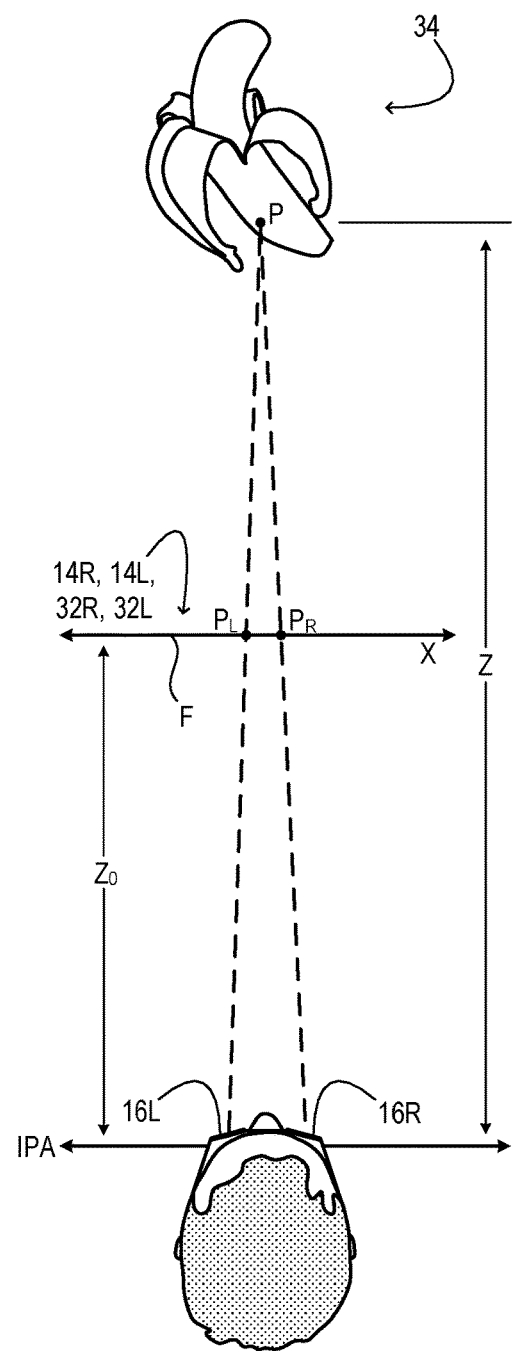

Once the distance $Z_0$ to focal plane F has been established, the depth coordinate Z for every surface point P of virtual object 34 may be set. This is done by adjusting the positional disparity of the two loci corresponding to point P in the right and left display images. In FIG. 4, the locus corresponding to point P in the right image frame is denoted $P_R$, and the corresponding locus in the left image frame is denoted $P_L$. In FIG. 4, the positional disparity is positive—i.e., $P_R$ is to the right of $P_L$ in the overlaid image frames. This causes point P to appear behind focal plane F. If the positional disparity were negative, P would appear in front of the focal plane. Finally, if the right and left display images were superposed (no disparity, $P_R$ and $P_L$ coincident) then P would appear to lie directly on the focal plane. Without tying this disclosure to any particular theory, the positional disparity D may be related to Z, $Z_0$, and to the interpupillary distance (IPO) by $$D = IPD \times \left(1 - \frac{Z_0}{Z}\right).$$

In the approach outlined above, the positional disparity sought to be introduced between corresponding loci of the right and left display images 14 is parallel to the interpupilary axis of the user of near-eye display device 10. Here and elsewhere, positional disparity in this direction is called 'horizontal disparity,' irrespective of the orientation of the user's eyes or head. Based on an estimate of the user's pupil positions, the processor of the near-eye display device may be configured to shift and scale the display images by an appropriate amount to cancel any vertical component of the positional disparity, and to ensure that the remaining horizontal disparity is of an amount to place the rendered virtual object at the specified distance in front of the user.

The approach outlined above admits of many variants and equally many algorithms to enact the required shifting and scaling. In one embodiment, processor 20 maintains a model of the Cartesian space in front of the user in a frame of reference fixed to near-eye display device 10. The user's pupil positions (assumed, estimated, or determined by optional eye-imaging cameras) are mapped onto this space, as are the superimposed image frames 32R and 32L, positioned at the predetermined depth $Z_0$. (The reader is again directed to FIGS. 3 and 4.) Then, a virtual object 34 is constructed, with each point P on a viewable surface of the object having coordinates X, Y, and Z, in the frame of reference of the display system. For each point on the viewable surface, two line segments are constructed—a first line segment to the pupil position of the user's right eye and a second line segment to the pupil position of the user's left eye. The locus $P_R$ of the right display image, which corresponds to point P, is the intersection of the first line segment in right image frame 32R. Likewise, the locus $P_L$ of the left display image is the intersection of the second line segment in left image frame 32L. This procedure automatically provides the appropriate amount of shifting and scaling to eliminate any vertical disparity and to create the right amount of horizontal disparity to correctly render the viewable surface of the virtual object, placing every point P at the required distance from the user. In some embodiments, the required shifting and scaling may be done in the frame buffers of one or more graphics-processing units (GPUs) of processor 20, which accumulate the right and left display images. In other embodiments, electronically adjustable optics in microprojectors 12 may be used to shift and/or scale the display images by the appropriate amount.

Near-eye display device 10 may include sensory hardware to enable the device to reckon its position and orientation. In the embodiment illustrated in FIG. 1, the sensory hardware includes a global positioning-system (GPS) receiver 36, an inertial measurement unit (IMU) 38, and a magnetometer 40. The IMU itself may comprise a multi-axis accelerometer and a multi-axis gyroscope for detailed translation and rotation detection. The magnetometer may be configured to sense the absolute orientation of the near-eye display device. The near-eye display device may also include an optional machine-vision system including one or more forward-facing cameras 42 (as shown in FIG. 2). Downstream image-processing logic of the near-eye display device may be configured to recognize real objects imaged by the machine-vision system, and thereby allow the device to reckon its position and orientation.

FIG. 5 shows aspects of a near-eye display system 44 comprised of multiple near-eye display devices 10—viz., display devices 10A, 10B. The near-eye display devices of system 44 may be networked (i.e., communicatively coupled via a wireless network) so that each device user is able to experience the same virtual imagery, but from a perspective appropriate for the position and orientation of the device he or she is wearing. In the scenario illustrated in FIG. 5, the virtual imagery that the users are experiencing includes a weather display model 46. The weather-display model provides a visually appealing and informative holographic representation of a weather condition above a geographic region 48. In the illustrated example, the representation of the weather condition includes a cloud formation 50 and a plurality of air masses 52 (viz., 52A, 52B, 52C), which may correspond to different air temperatures. Additional aspects of the weather-display model are described further below.

FIG. 6A illustrates an example method 54 to illustrate a weather condition via a near-eye display system 44 of one or more near-eye display devices 10. Some of the data structures invoked in method 54 are shown schematically in accompanying FIG. 6B.

At 56 of method 54, a series of weather-data slices 58 is received from a network service. The network service may be hosted on a data server system of the National Weather Service, for example. A weather-data slice may be received for each of a series of elevations above a geographic region of any scale and shape. Geographic regions may include towns and cities, islands and coastlines, inland areas, and/or entire continents. In general, each weather-data slice defines at least one weather-parameter value 62 for each of a plurality of 2D coordinates at a given elevation. In some examples, the weather-parameter value may include an air temperature 37 degrees Fahrenheit. In some examples, the weather-parameter value may include a vector-valued wind velocity—e.g., 16 miles per hour east-by-southeast. In some examples, the weather-parameter value may include a cloud density or cloud opacity. In some examples, the weather-parameter value may include a precipitation amount—e.g., 0.35 inches per hour. The weather-data slices received at 56 may include any, some, or all of the above weather-parameter values, in addition to any other suitable parameter value. The range of elevations associated with the series of weather data slices is not particularly limited, but may be confined to meteorologically relevant elevations—e.g., zero to 20,000 feet above the geographic region in increments of 1000 feet.

At 66 the weather-data slices are analyzed (e.g., parsed), and a volume-filling weather model 68 is constructed based on the weather-parameter values 62 for each elevation and 2D coordinate. In some examples, the volume-filling weather model pairs the weather-parameter value to associated 3D coordinates in Cartesian space—e.g., X, Y, Z, where X is latitude, Y is longitude, and Z is elevation. In scenarios in which the weather-data slices are received from different sources—or otherwise admit of different resolutions, units, and/or encoding for the various weather-parameter values— analysis at 66 may include reconciling the different resolutions, units, and/or encoding.

Starting at 70 of method 54, a weather-display model 46 is constructed based on volume filling weather model 68. The weather-display model includes at least one display-parameter value 72 for each of the plurality of 3D coordinates of the volume-filling weather model. The one or more display-parameter values may be related to (and derived from) the weather-parameter values described above. In some examples, a display-parameter value may be directly related to the underlying weather-parameter value (e.g., air temperature, wind velocity, cloud density, and precipitation amount). However, the display-parameter values are also configured to provide a visually appealing and informative description of weather conditions; as such, they may be obliquely related to the underlying weather-parameter value. Sequential application of digital filtering and coordinate transformation results in the weather-display model, in which selected weather-parameter values are paired to corresponding display-parameter values. In some examples, the weather-display model is configured to spatially lock into the representation of the geographic region 48, so that the representation of the geographic region and the weather-display model above it form a connected virtual display object that can be moved and sized together, and viewed from any perspective. This feature also allows each representation to visually affect the other. For example, clouds in the weather-display model may cast shadows on the landscape of the representation of the geographic region. Conversely, tall buildings included in the representation of the geographic region may eclipse the visual characteristics of the air mass behind them.

At 70 a digital filter is applied to the volume-filling weather model. The digital filter may be configured to reduce any distracting or visually undesirable feature present in the volume-filling weather model. In some examples, applying the digital filter includes nulling the weather-parameter if the weather-parameter value is below a threshold. For instance, cloud cover below a threshold density may be nulled in certain areas so that no cloud cover appears in those areas. This feature enables the user to focus his or her attention on denser cloud formations.

In some examples, applying the digital filter may include averaging to reduce noise or natural anomalies. Highly resolved air-temperature data, for example, sometimes reveals localized pockets of anomalously warm or cool air that does little to advance the user's understanding of the overall weather condition. For display purposes, the temperature of such pockets may be smoothed out by taking an average over a larger region. In method 54, the filtering is enacted on a weather-display model having the maximum initial resolution. In other embodiments, the weather-data slices may be filtered prior to construction of the weather-display model.

At 74 a coordinate transform is applied to the digitally filtered, volume-filling weather model. In some examples, applying the coordinate transform includes mapping the weather-parameter value into a volume of compressed elevation. The volume of compressed elevation may be compressed non-linearly, in some examples. This feature is useful for displaying cloud density as a function of elevation. The range of commonly observed cloud elevations is extremely large—20 to 20,000 feet in some examples. By having this range compressed non-linearly into an approachable display space, the weather-display model offers a useful, qualitative understanding of the various cloud strata. For example, the height clouds are displayed in the virtual reality simulation can be decreased from the height at which they are actually present in the real world, thus allowing a weather simulation to be displayed in a more compact viewing area.

At 76 a representation of the geographic region 48 is displayed via near-eye display system 10. In some examples, displaying the representation of the geographic region includes simulating an illumination of the geographic region based on a time of day. In some examples, displaying the representation of the geographic region includes simulating an illumination of the geographic region based on overhead cloud density and/or precipitation amount. More specifically, the time of day may determine the position of the sun, with the cloud cover and precipitation amount determining the pattern and depth of the shadow obscuring the sunlight. In some examples, displaying the representation of the geographic region includes simulating a sheen of the geographic reason based on a precipitation amount. Areas receiving rain may appear shiny, and areas receiving snow may appear white.

At 78 the weather-display model is displayed via the near-eye display system, co-registered to the representation of the geographic region. In some examples, displaying the weather-display model includes simulating an illumination of cloud cover at a first elevation based on overhead cloud density and/or precipitation amount at a higher, second elevation.

In some examples, displaying the weather-display model 46 includes displaying a temporal evolution of the weather condition. In one scenario, the temporal evolution may include an accelerated review of past weather conditions over a given geographic area. In another scenario, the temporal evolution of the volume-filling weather model and/or weather-display model may be extrapolated forward in time to obtain a holographic forecast of the weather condition.

In some examples, the representation of the geographic region 48 and the representation of the weather-display model 46 are projected into a field of view of each user of the near-eye display system depending on the location and orientation of that user. For instance, the representation of the geographic region and co-registered representation of the weather-display model may be projected so as to constitute a spatially persistent virtual object viewable from a plurality of orientations.

No aspect of the foregoing method should be interpreted in a limiting sense, for numerous variations, extensions, and omissions are contemplated. For instance, while each of the weather-data slices 58 may completely cover geographic region 48 in some scenarios, it is also envisaged that the act of constructing volume-filling weather model 68 may include laterally stitching together two or more slices associated with the same elevation, but different portions of the geographic region.

As noted above, the methods and processes described herein may be tied to a computer system of one or more computing devices. In particular, such methods and processes may be implemented as a computer system-application program or service, an application-programming interface (API), a library, and/or other computer system-program product.

FIG. 1 schematically shows a non-limiting embodiment of a computer system 18 that can enact the methods and processes described above. Computer system 18 includes a processor 20 and an electronic memory machine 22, for example. Computer system 18 includes a display subsystem, input subsystem, communication subsystem, and may include other components not shown in FIG. 1.

Processor 20 includes one or more physical devices configured to execute instructions. For example, the processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Processor 20 may be one of a plurality of processors configured to execute software instructions. Additionally or alternatively, the processor may include one or more hardware or firmware logic machines configured to execute hardware or firmware instructions. Processors of computer system 18 may be single-core or multi-core, and the instructions executed thereon may be configured for sequential, parallel, and/or distributed processing. Individual components of the computer system optionally may be distributed among two or more separate devices, which may be remotely located and/or configured for coordinated processing. Aspects of the computer system may be virtualized and executed by remotely accessible, networked computing devices configured in a cloud-computing configuration.

Electronic memory machine 22 includes one or more physical devices configured to hold instructions executable by processor 20 to implement the methods and processes described herein. When such methods and processes are implemented, the state of electronic memory machine 22 may be transformed—e.g., to hold different data.

Electronic memory machine 22 may include removable and/or built-in devices. Electronic memory machine 22 may include semiconductor memory (e.g., RAM, EPROM, EPROM, etc.), and/or magnetic memory (e.g., hard-disk drive, floppy-disk drive, tape drive, MRAM, etc.), among others. Electronic memory machine 22 may include volatile, nonvolatile, dynamic, static, read/write, read-only, random-access, sequential-access, location-addressable, file-addressable, and/or content-addressable devices.

It will be appreciated that electronic memory machine 22 includes one or more physical devices. However, aspects of the instructions described herein alternatively may be propagated by a communication medium (e.g., an electromagnetic signal, an optical signal, etc.) that is not held by a physical device for a finite duration.

Aspects of processor 20 and electronic memory machine 22 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of computer system 18 implemented to perform a particular function. In some cases, a module, program, or engine may be instantiated via processor 20 executing instructions held by electronic memory machine 22. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

A display subsystem may be used to present a visual representation of data held by electronic memory machine 22. This visual representation may take the form of a graphical user interface (GUI). As the herein described methods and processes change the data held by the storage machine, and thus transform the state of the storage machine, the state of the display subsystem may likewise be transformed to visually represent changes in the underlying data. The display subsystem may include one or more near-eye display devices utilizing virtually any type of technology. Such near-eye display devices may be combined with processor 20 and/or electronic memory machine 22 in a shared enclosure, or such near-eye display devices may be peripheral near-eye display devices.

An input subsystem may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

A communication subsystem may be configured to communicatively couple computer system 18 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computer system 18 to send and/or receive messages to and/or from other devices via a network such as the Internet.

One aspect of this disclosure is directed to a method to illustrate a weather condition via a near-eye display system. The method comprises displaying a representation of a geographic region via the near-eye display system; for each of a series of elevations above the geographic region, receiving a weather-data slice defining a weather-parameter value for each of a plurality of 2D coordinates at that elevation; constructing a volume-filling weather model based on the weather-parameter values received for each elevation and 2D coordinate; applying a digital filter and a coordinate transform to the volume-filling weather model to obtain a weather-display model, the weather-display model including a display-parameter value for each of a plurality of 3D coordinates; and displaying the weather-display model via the near-eye display system, co-registered to the representation of the geographic region.

In some implementations, the weather-parameter value includes an air temperature. In some implementations, the weather-parameter value includes a vector-valued wind velocity. In some implementations, the weather-parameter value includes a cloud density and/or precipitation amount. In some implementations, applying the digital filter includes nulling the weather-parameter if the weather-parameter value is below a threshold. In some implementations, applying the digital filter includes averaging to reduce noise. In some implementations, applying the coordinate transform includes mapping the weather-parameter value into a volume of compressed elevation. In some implementations, the volume of compressed elevation is compressed non-linearly. In some implementations, displaying the representation of the geographic region includes simulating an illumination of the geographic region based on a time of day. In some implementations, displaying the representation of the geographic region includes simulating an illumination of the geographic region based on overhead cloud density and/or precipitation amount. In some implementations, displaying the weather-display model includes simulating an illumination of cloud cover at a first elevation based on overhead cloud density and/or precipitation amount at a higher, second elevation. In some implementations, displaying the representation of the geographic region includes simulating a sheen of the geographic region based on a precipitation amount. In some implementations, displaying the weather-display model includes displaying a temporal evolution of the weather condition. In some implementations, the temporal evolution includes a forecasted temporal evolution. In some implementations, the representation of the geographic region and the representation of the weather-display model are projected into a field of view of each user of the near-eye display system based on a location and orientation of that user. In some implementations, the representation of the geographic region and co-registered representation of the weather-display model are projected so as to constitute a spatially persistent virtual object viewable from a plurality of orientations.

Another aspect of this disclosure is directed to a method to illustrate a weather condition via a near-eye display system. The method comprises displaying a representation of a geographic region via the near-eye display system; for each of a series of elevations above the geographic region, receiving a weather-data slice defining a weather-parameter value for each of a plurality of 2D coordinates at that elevation; constructing a volume-filling weather model based on the weather-parameter values received for each elevation and 2D coordinate; applying a digital filter and a coordinate transform to the volume-filling weather model to obtain a weather-display model, the weather-display model including a display-parameter value for each of a plurality of 3D coordinates, the coordinate transform mapping the weather-parameter value into a volume of compressed elevation; and displaying the weather display model via the near-eye display system, co-registered to the representation of the geographic region, wherein displaying the representation of the geographic region includes simulating an illumination of the geographic region based on overhead cloud density and/or precipitation amount.

In some implementations, the weather-parameter value includes an air temperature. In some implementations, the weather-parameter value includes one or more of cloud density and precipitation amount.

Another aspect of this disclosure is directed to a near-eye display system configured to illustrate a weather condition. The system comprises a network device; a near-eye microprojector; an inertial measurement sensor; operatively coupled to the network device, the near-eye display, and the inertial measurement unit, logic configured to: display, via the near-eye microprojector, a representation of a geographic region, for each of a series of elevations above the geographic region, receive from the network device a weather-data slice defining a weather-parameter value for each of a plurality of 2D coordinates at that elevation, construct a volume-filling weather model based on the weather-parameter values received for each elevation and 2D coordinate, apply a digital filter and a coordinate transform to the volume-filling weather model to obtain a weather-display model, the weather-display model including a display-parameter value for each of a plurality of 3D coordinates, and display, via the near-eye microprojector, the weather-display model via the near-eye display system, co-registered to the representation of the geographic region.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method to illustrate a weather condition via a near-eye display system, the method comprising:
displaying a representation of a geographic region via the near-eye display system;
for each of a series of elevations above the geographic region, receiving a weather-data slice defining a weather-parameter value for each of a plurality of 2D coordinates at that elevation;
constructing a volume-filling weather model based on the weather-parameter values received for each elevation and 2D coordinate;
applying a digital filter and a coordinate transform to the volume-filling weather model to obtain a weather-display model, the weather-display model including a display-parameter value for each of a plurality of 3D coordinates; and
displaying the weather-display model via the near-eye display system, co-registered to the representation of the geographic region.

2. The method of claim 1 wherein the weather-parameter value includes an air temperature.

3. The method of claim 1 wherein the weather-parameter value includes a vector-valued wind velocity.

4. The method of claim 1 wherein the weather-parameter value includes a cloud density and/or precipitation amount.

5. The method of claim 1 wherein applying the digital filter includes nulling the weather-parameter if the weather-parameter value is below a threshold.

6. The method of claim 1 wherein applying the digital filter includes averaging to reduce noise.

7. The method of claim 1 wherein applying the coordinate transform includes mapping the weather-parameter value into a volume of compressed elevation.

8. The method of claim 7 wherein the volume of compressed elevation is compressed non-linearly.

9. The method of claim 1 wherein displaying the representation of the geographic region includes simulating an illumination of the geographic region based on a time of day.

10. The method of claim 1 wherein displaying the representation of the geographic region includes simulating an illumination of the geographic region based on overhead cloud density and/or precipitation amount.

11. The method of claim 1 wherein displaying the weather-display model includes simulating an illumination of cloud cover at a first elevation based on overhead cloud density and/or precipitation amount at a higher, second elevation.

12. The method of claim 1 wherein displaying the representation of the geographic region includes simulating a sheen of the geographic region based on a precipitation amount.

13. The method of claim 1 wherein displaying the weather-display model includes displaying a temporal evolution of the weather condition.

14. The method of claim 13 wherein the temporal evolution includes a forecasted temporal evolution.

15. The method of claim 1 wherein the representation of the geographic region and the representation of the weather-display model are projected into a field of view of each user of the near-eye display system based on a location and orientation of that user.

16. The method of claim 1 wherein the representation of the geographic region and co-registered representation of the weather-display model are projected so as to constitute a spatially persistent virtual object viewable from a plurality of orientations.

17. A method to illustrate a weather condition via a near-eye display system, the method comprising:
displaying a representation of a geographic region via the near-eye display system;
for each of a series of elevations above the geographic region, receiving a weather-data slice defining a weather-parameter value for each of a plurality of 2D coordinates at that elevation;
constructing a volume-filling weather model based on the weather-parameter values received for each elevation and 2D coordinate;
applying a digital filter and a coordinate transform to the volume-filling weather model to obtain a weather-display model, the weather-display model including a display-parameter value for each of a plurality of 3D coordinates, the coordinate transform mapping the weather-parameter value into a volume of compressed elevation; and
displaying the weather display model via the near-eye display system, co-registered to the representation of the geographic region, wherein displaying the representation of the geographic region includes simulating an illumination of the geographic region based on overhead cloud density and/or precipitation amount.

18. The method of claim 17 wherein the weather-parameter value includes an air temperature.

19. The method of claim 17 wherein the weather-parameter value includes one or more of cloud density and precipitation amount.

20. A near-eye display system configured to illustrate a weather condition, the system comprising:
a network device;
a near-eye microprojector;
an inertial measurement sensor;
operatively coupled to the network device, the near-eye display, and the inertial measurement unit, logic configured to:
display, via the near-eye microprojector, a representation of a geographic region,
for each of a series of elevations above the geographic region, receive from the network device a weather-data slice defining a weather-parameter value for each of a plurality of 2D coordinates at that elevation,
construct a volume-filling weather model based on the weather-parameter values received for each elevation and 2D coordinate,
apply a digital filter and a coordinate transform to the volume-filling weather model to obtain a weather-display model, the weather-display model including a display-parameter value for each of a plurality of 3D coordinates, and
display, via the near-eye microprojector, the weather-display model via the near-eye display system, co-registered to the representation of the geographic region.

* * * * *